United States Patent [19]

Boscher et al.

[11] Patent Number: 4,986,627
[45] Date of Patent: Jan. 22, 1991

[54] METHOD FOR CONNECTING OPTICAL FIBRES WITHOUT FRESNEL REFLECTION AND SYSTEM THUS DETAINED, VARIABLE OPTICAL ATTENUATOR AND SYSTEM USING THIS ATTENUATOR TO MEASURE THE EFFECT OF THE REFLECTION COEFICIENT ON AN OPTICAL LINE

[75] Inventors: Daniel Boscher, Trebeurden; René Le Marer, Tregastel; Gabrielle Perrin, Lannion, all of France

[73] Assignee: Etat Francais (Centre National d'Etudes des Telecommunications), Issy les Molineaux, France

[21] Appl. No.: 363,588

[22] Filed: Jun. 8, 1989

[30] Foreign Application Priority Data

Jun. 10, 1988 [FR] France .................................. 88 07788
Feb. 22, 1989 [FR] France .................................. 89 02290

[51] Int. Cl.⁵ ............................................. G02B 6/38
[52] U.S. Cl. ............................... 350/96.21; 350/96.15; 350/96.29; 350/320
[58] Field of Search ............... 350/96.15, 96.16, 96.20, 350/96.21, 96.22, 96.29, 320; 356/73.1

[56] References Cited

U.S. PATENT DOCUMENTS 4,783,137 11/1988 Kosman et al. .................. 350/96.16

FOREIGN PATENT DOCUMENTS 0171271 2/1986 European Pat. Off. .
57-11313 1/1982 Japan .
59-05216 1/1984 Japan .
60-175007 9/1985 Japan .............................. 350/96.13
61-102604 5/1986 Japan .

OTHER PUBLICATIONS

Sankawa et al., "Methods for Reducing the Fresnel Reflection . . . ", Electronics and Commun. in Japan, vol. 69, No. 1, Jan. 1986, pp. 94–102.

Primary Examiner—John D. Lee
Attorney, Agent, or Firm—Blakely, Sokoloff, Taylor & Zafman

[57] ABSTRACT

This invention concerns a method for connecting optical fibres, comprising stages consisting in (i) effecting a controlled rough polishing of the interface (5) of the fibres (1) to be connected, (ii) steeping the ends of the fibres (1) in a concentrated solution hydrofluoric acid and (iii) aligning then connecting the fibres (1) using an index matching material (FIG. 4). The invention also concerns a variable optical attenuator and a system using this attenuator to measure the effect of the reflection coefficient on an optical line.

23 Claims, 3 Drawing Sheets

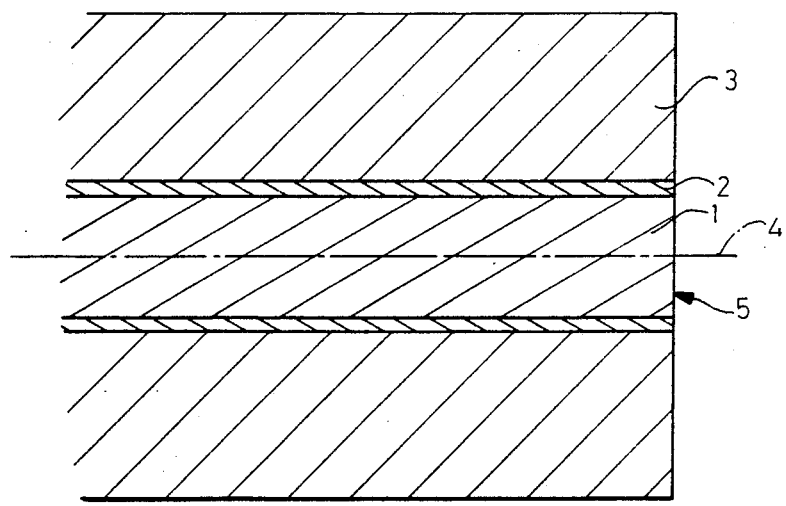
FIG_1
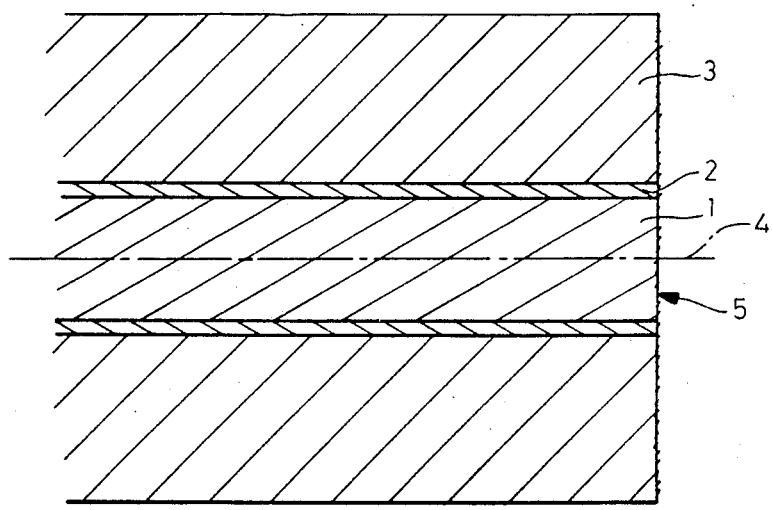
FIG_2

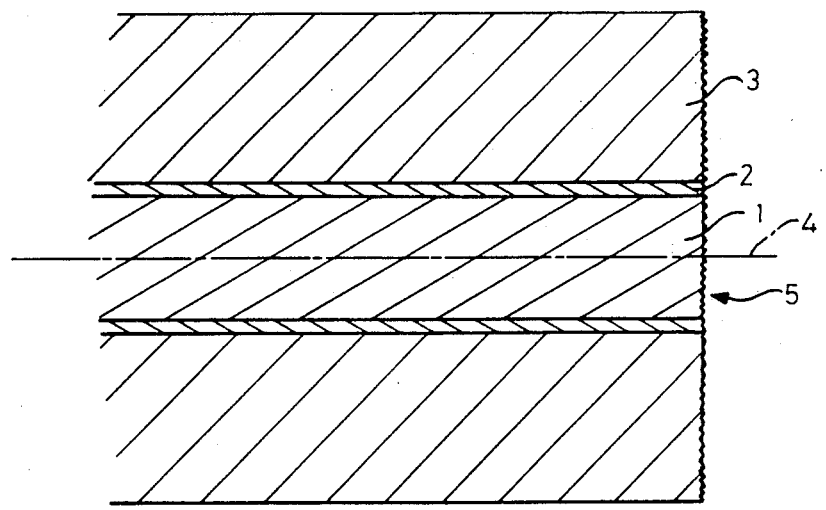
FIG_3
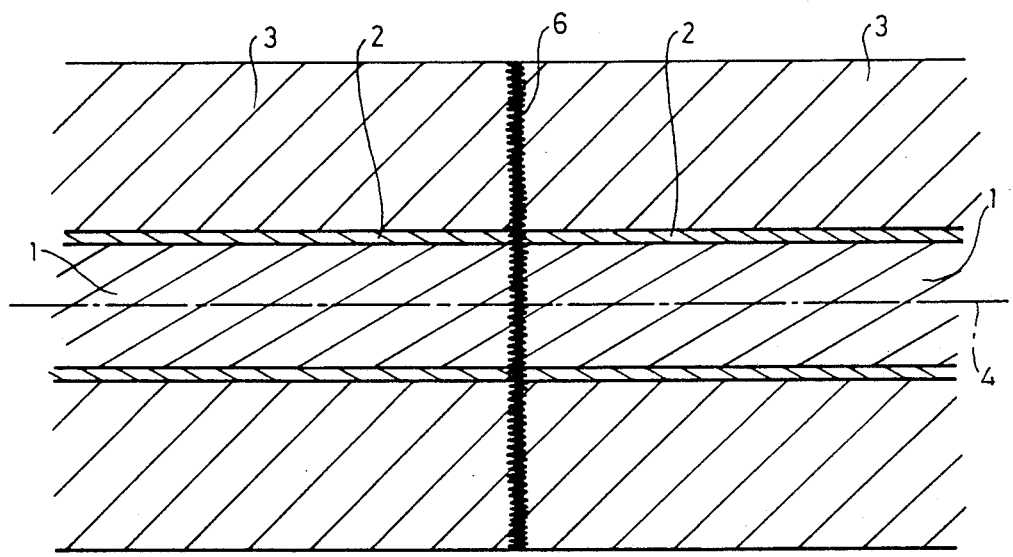
FIG_4

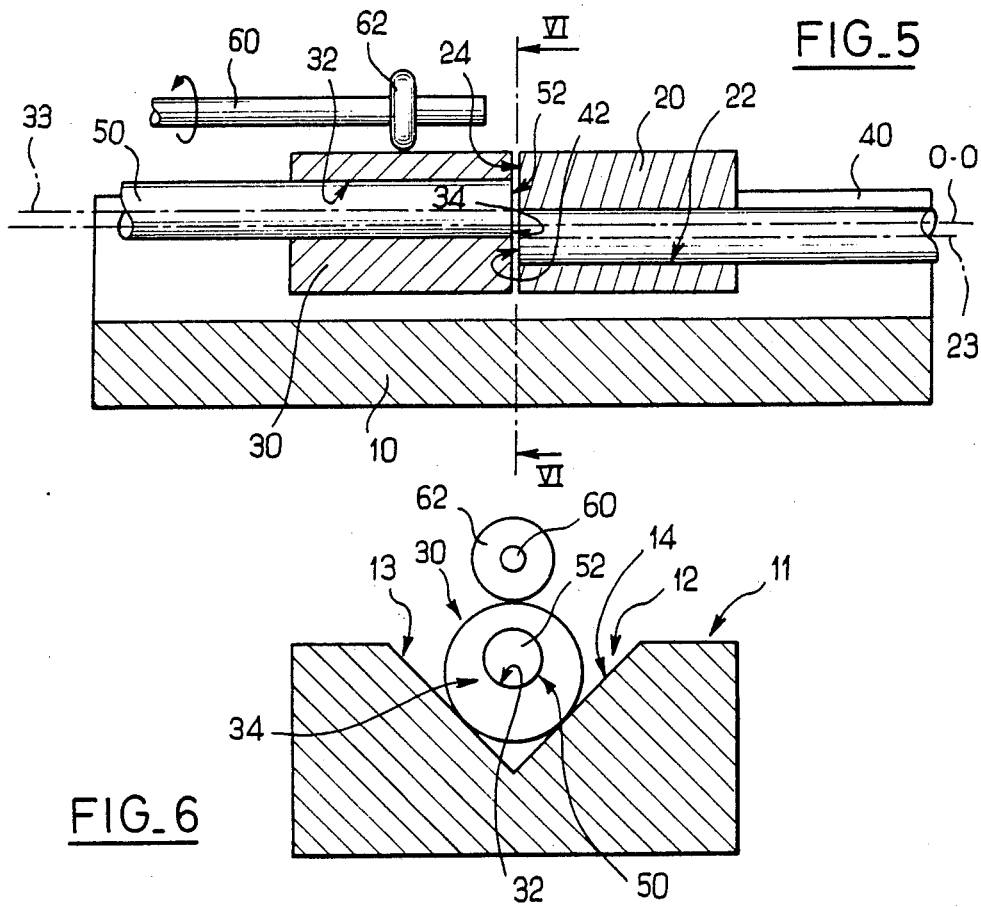
FIG_5
FIG_6
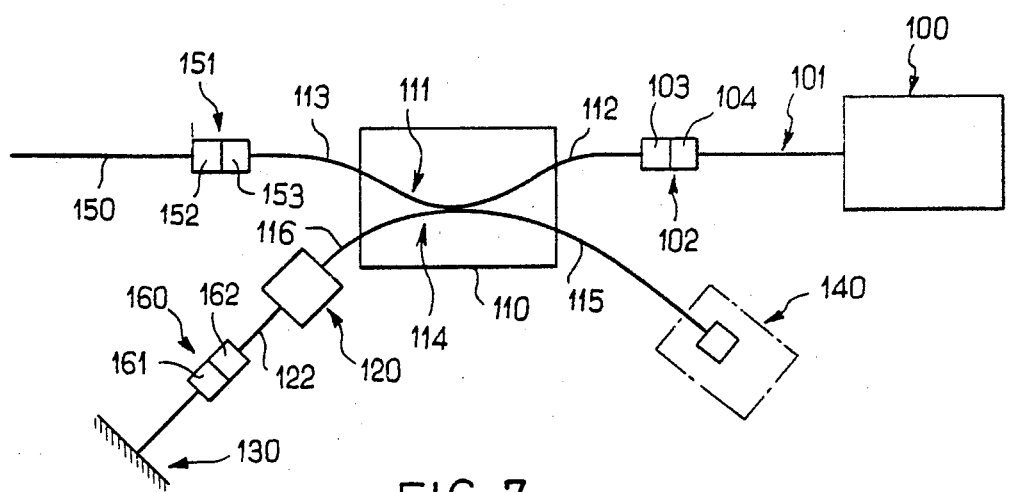
FIG_7

METHOD FOR CONNECTING OPTICAL FIBRES WITHOUT FRESNEL REFLECTION AND SYSTEM THUS DETAINED, VARIABLE OPTICAL ATTENUATOR AND SYSTEM USING THIS ATTENUATOR TO MEASURE THE EFFECT OF THE REFLECTION COEFICIENT ON AN OPTICAL LINE

This invention concerns optical fibre transmission lines and optical fibre connections.

The conventional technique for connecting two optical fibres consists in effecting a very fine optical polishing of the interface of each fibre to be connected, then aligning and connecting the fibres.

Most frequently, to minimise losses, an index matching material, the index of which is matched to the fibres used, is interposed between the interfaces of the fibres to be connected at the alignment and connection stage (see Electronics and Communications in Japan, Volume 69, number 1, January 1966, pages 94 to 102).

However, in spite of the index matching material, connections obtained in this way generally present a substantial backscatter peak. This backscatter peak is very harmful to the operation of certain components placed at the ends of fibres, in particular components used in high data signalling rate communication systems.

This peak can also considerably impede the testing of connections using the backscattering method.

The purpose of this invention is to eliminate this backscatter peak almost completely.

According to the invention, this objective is achieved using an optical fibre connection method which consists in: (i) effecting a controlled rough polishing of the interface of the fibres to be connected, (ii) steeping the ends of the fibres in a concentrated solution of hydrofluoric acid and (iii) aligning then connecting the fibres using an index matching material.

The invention also concerns optical systems obtained using the method.

The invention also concerns in particular a variable optical attenuator and a system using this attenuator to measure the effect of the reflection coefficient on an optical line.

Many optical attenuators have already been proposed. For example, optical attenuators using liquid crystals have been proposed. However these optical attenuators present a high reflection coefficient.

Attenuators have also been proposed using fibre curvature. These attenuators have the advantage of being free from reflection. However their dynamic range and stability are poor.

Optical attenuators so far proposed have not therefore proved fully satisfactory. The main objective of this invention is to propose a new attenuator which eliminates the above disadvantages.

This objective is achieved according to the invention using an attenuator comprising:
  two optical fibres one end of each of which is previously treated by controlled rough polishing then steeped in a concentrated solution of hydrofluoric acid to prevent any Fresnel reflection, as indicated above, and
  two supporting elements, capable of controlled relative movement and adapted to receive and support respectively said fibres in such a way that the treated ends of said fibres are positioned facing each other, with their axes parallel, but with an overlap area which varies as a function of the relative position of said supporting elements.

According to an advantageous characteristic, one of the supporting elements consists of a ferrule with a cylindrical outer casing bored with an eccentric hole capable of receiving one of the fibres.

In addition, the increase in data signalling rates over optical fibre links has given rise to a need for impedance matching of the line to avoid spurious reflections which can generate faults:
  a—through interaction in the laser cavities,
  b—through intermodulation when reflections occur at several points on the line.

This problem has been the subject of much laboratory research and many publications; recent examples include:
  (1)—degradation in 6 bits DFB laser . . . by multiple reflection points J. L. GIMLETT and Al. Bell Communication Research, Electronics letters 31 March, 1988;
  (2)—High return loss optical fibre connectors R. RAO Dorran/3M opto May, 1988;
  (3)—Reflections from polished single mode Fibre Ends A. F. JUDY ATT fibre and integrated optics vol. 7 Nb1 1988;
  (4)—A convenient field installable antireflection coating . . . A. W. Lightstone RCA Fibre and Integrated optics vol. 7 Nb3 1988;
  (5)—High stable insertion—high return loss PT optical . . . T. SHINTAKER NTT ECOC September 1988;
  (6)—Reflectance Measurements in light wave systems S. K. DAS ATT Symposium on optical fibres measurement September 1988 return loss studies of single-ended single mode fibre.
  (7)—V. Shah Bellcore symposium on optical fibre measurement September 1988.

Results obtained to date endeavouring to eliminate the disadvantages occasioned by line reflections are not totally satisfactory.

In particular, it has not so far proved possible to determine what is the acceptable level of reflection for an installation.

The secondary objective of this invention is therefore to propose a system which can be used precisely to measure the acceptable level of reflection.

This objective is achieved according to the invention using a system which includes a two branch coupler, the transmission coefficient of which is known, having one end of a first branch coupled to an emitting means, while the second branch of the coupler has one of its ends coupled through the intermediary of an optical attenuator of the type mentioned above to a reflecting means, and its second end coupled to an optical detecting means.

Under the control of the optical attenuator, such a system can be used to monitor the reflection coefficient of the signal transferred to the emitting means, consequently to monitor the effect of the signal thus reflected and therefore to determine the acceptable reflection coefficient. Other characteristics, objectives and advantages of this invention will appear on reading the detailed description which follows, with reference to the attached drawings, given by way of non-limitative example and on which:

FIGS. 1 to 4 represent different successive stages of the connection method according to the invention, FIG. 5 is a schematic view in longitudinal vertical section of an optical attenuator device in accordance with the invention, FIG. 6 is a cross sectional view of the same device along a reference section VI—VI on FIG. 5 and FIG. 7 is a general view of a system in accordance with the invention for measuring the acceptable reflection coefficient on a line.

FIG. 1 attached shows an end of an optical fibre 1 to be connected to an end of a second similar optical fibre.

Preferably, and in a manner known in itself, the optical fibre 1 is steeped in a coating resin 2 and centered in a ferrule 3, for example of metal The use of such a coating resin 2 and a ferrule 3 facilitates manipulation and alignment of the optical fibres but is not essential to the present invention.

The interface of fibre 1, transverse to its longitudinal axis 4, bears the reference 5.

The first stage of the method according to this invention consists in effecting a controlled rough polishing of the interface 5 of the fibres to be connected to obtain, as illustrated schematically in FIG. 2, a granular interface 5.

This polishing is preferably effected with disks with a grain size greater than $3\mu$, and very advantageously with a grain size between 3 and $12\mu$.

The second stage of the method according to the present invention consists in treating the interface 5 of the fibres with an etchant.

The purpose of the etchant treatment is to achieve a cracked, irrigated interface 5, as schematically illustrated in FIG. 3 attached. For this, the interface 5 of the fibres is steeped in a solution of hydrofluoric acid. It is quite satisfactory to steep the interface 5 of the fibres in a solution of hydrofluoric acid for a period more than 20 seconds, preferably between 20 and 30 seconds, with a concentration of acid for example of 40%.

Treating the interface 5 with an etchant under the above conditions enables cracks of an average width of 1 to $2\mu$ to be generated.

The final stage of the method according to the invention consists in aligning and connecting two fibres 1, interposing an index matching material 6 between the interfaces 5, as schematically illustrated in FIG. 4 attached.

The index of the matching material 6 is matched to the index of the fibres 1. The index matching material 6 can be an oil or a UV polymerisable resin. Oil is currently preferred because it has greater index stability.

The presence of cracks on the interfaces 5 improves the ability of the index matching fluid 6 to moisten the interfaces 5.

The fibre alignment and connection process as such is effected according to techniques known in themselves, which will not be described in further detail here.

It will however be noted that during the alignment operation, care must be taken with the angular, longitudinal and axial alignment of the fibres.

An optical fibre connection effected in accordance with the invention enables a reflection of less than $-50$ dB to be obtained whereas the best performances obtained previously were $-38.6$ dB.

The connection method in accordance with the invention applies in particular to connectors, line connections, couplers and multiplexers.

FIGS. 5 and 6 show an optical attenuator which comprises a supporting base 10 and two ferrules 20, 30, which receive respective optical fibres 40, 50.

The base 10 is formed from a single block having a V shaped groove 12 which opens onto its upper surface 11. The groove 12 is delimited by two flat surfaces 13, 14, symmetrical with respect to a plane vertical to the direction of use. The angle between the two flat surfaces 13, 14 is advantageously of the order of 90°.

The two ferrules 20, 30 are of identical structure. They are each formed from a cylinder bored with a hole 22, 32.

These holes 22, 32, are parallel to the axis of the ferrules 20, 30 but are eccentric with respect to the outer casing of the ferrules.

The ferrules 20, 30 are placed in the groove 12 with their longitudinal axis parallel to the bottom of the groove. Those skilled in the art will easily understand that insofar as the ferrules 20, 30 have identical outer diameters, their longitudinal axes are coaxial. On FIG. 5, the reference O—O shows a line coinciding with the central axes of the ferrules 20, 30. The axes of the holes 22, 32 carry the respective references 23 and 33.

The ferrule 20 is attached in the groove 12 by any appropriate conventional means, for example using adhesive.

The second ferrule 30 is guided in rotation around the axis O—O in the groove 12 and driven in rotation around this axis by appropriate means.

For preference, ferrules 20, 30 and the base 10 are made of a ceramic material in order to limit the wear on these elements and to guarantee the lasting precision of the device.

The fibres 40, 50 are engaged respectively in holes 22, 32 of the ferrules 20, 30. For this purpose, the holes 22, 32 are complementary to the external casing of these fibres.

Those skilled in the art will easily understand that because of the eccentricity of the holes 22, 32, the rotation of the ferrule 30 around the axis O—O enables the light flux transmitted from fibre 40 to fibre 50 or vice versa to be modified.

The ends 42, 52 of the fibres 40, 50 which are level with the opposite transverse faces 24, 34 of the ferrules are treated according to the method described previously consisting first of all in effecting a controlled rough polishing of the ends of the fibres then treating the ends of the fibres with an etchant to eliminate all Fresnel reflection.

The inventors have conducted tests on an attenuator device of the type previously described comprising ferrules 20, 30 with an external diameter of 2.5 mm, having holes 22, 32 of a diameter of $127\mu$, off-centre by 7 to $10\mu$ for monomode fibres and 30 to $50\mu$ for multimode fibres. Such an attenuator can be used to obtain an attenuation coefficient which varies between 3 and 60 dB, without spurious reflection.

The means for driving the ferrule 30 in rotation around the axis O—O can be implemented in many ways.

According to the particular embodiment considered currently as the preferred embodiment, shown in FIGS. 5 and 6, the drive means comprise a journal 60 which carries a toric rubber belt 62. The journal 60 is parallel to the axis O—O. The belt 62 lies on the external periphery of the ferrule 30. The journal 60 can be driven in rotation around its axis by appropriate conventional means, if necessary through the intermediary of a reduction gear.

FIG. 7 attached shows a system in accordance with the present invention for determining the acceptable reflection coefficient in a line.

FIG. 7 shows an emitting means 100, a coupler 110, an optical attenuator 120, a reflecting means 130 and an optical detecting means 140.

The optical coupler 110 is a coupler with two branches 111, 114. It preferably has a transfer ratio of 50/50. The coupler 110 can be obtained in a manner known in itself by fusion drawing or by abrasion sawing.

The emitter 100 is coupled to one end 112 of the first branch 111 through the intermediary of an optical fibre 101 and a connector 102. The connector 102 consists of two half-connectors 103, 104, anti-reflection treated To this end, the half connectors 103, 104 can be of the biased polished connector type, or preferably, surface treated using the method described previously.

The second end 113 of the first branch 111 of the coupler is connected to the transmission line 150 through the intermediary of the second connector 151. The connector 151 consists of two half connectors 152, 153, similar to the half connectors 103, 104 mentioned above.

One of the ends 115 of the second branch of the coupler 110, which is adjacent the first end 112 mentioned above, is coupled to an optical detector 140. The function of the detector 140 is to measure the intensity of the light flux from the end 115 of the coupler. To this end, the end 115 of the coupler can be linked to a cross cut terminal part placed in a cell or in a photodiode and associated with an appropriate electronic circuit.

The upper end 116 of the second branch 114 of the coupler is connected to the reflecting means 130 through the intermediary of the attenuator means 120.

The reflector means 130 can be formed from a polished terminal part on which a thin film of reflector material has been deposited, for example gold or silver.

The optical attenuator 120 is preferably of the type shown in FIGS. 5 and 6 attached as previously described. The optical fibre which enables the optical attenuator 120 to be connected to the reflector means 130 carries the reference 122 on attached FIG. 7.

Preferably as shown in this figure, the optical attenuator 120 is connected to the reflector means 130 through the intermediary of a connector 160 interposed on the optical fibre 122. The connector 160 consists of two half connectors 161, 162 similar to the connectors 102, 151 mentioned previously, which are anti-reflection treated.

The general operation of the system shown in FIG. 7 is as follows.

The light flux emitted by the element 100 which arrives at the input 112 of the coupler 110 through the intermediary of the connector 102 is divided into two identical fluxes directed respectively to the ends 113 and 116 of the coupler. Half of the flux generated by the emitter 100 is therefore directed through the intermediary of the connector 151 to the transmission line 150. The other half of the flux generated by the emitter 100 is directed to the variable attenuator 120. The part of the flux transmitted by the attentuator 120 reaches the reflector 130 through the intermeidary of the connector 160. This flux is reflected on the reflector 130, passes again through the connector 160 and reaches the attenuator 120. The part of the light flux which again passes through the attenuator 120 reaches the end 116 of the coupler 110. The flux reinjected into the coupler 110 is divided into two equal parts directed respectively to the emitting means 100 and to the detecting means 140.

Said means 140 can consequently be used to measure directly the amplitude of the reflected signal conveyed to the emitting means 100 and therefore to control a simulated reflection coefficient of a line. The detecting means 140 receives a flux directly identical to that reinjected to the emitting means 100 whether from the attenuator 120 or from the line 150.

By modifying the attenuator coefficient introduced by the attenuator 120 by rotating the ferrule 30, it is possible to verify the simulated reflection coefficient and thus determine the acceptable reflection coefficient. Using an optical attenuator of the type shown in FIGS. 5 and 6 previously described enables a reflection coefficient to be obtained which can vary between −10 dB and −60 dB with a fixed, known insertion loss. It will be noted that the system shown in FIG. 7 attached can be used as a reflection-free programmable variable attentuator if the half-connector 162 is connected to the half-connector 152. The minimum attenuation is then given by the coupling coefficient of the coupler 100 and its insertion loss, approximately 4 dB. The maximum attenuation defined by the element 120 is infinite. It will be noted that the sensitivity of the system in the variable attenuator configuration which has just been described as a variant is twice the sensitivity in the variable reflection coefficient measurement configuration shown in FIG. 7. According to the configuration shown in FIG. 7, the light passes twice through the variable attenuator 120 whereas it passes through this attenuator 120 only once in the single attenuator configuration variant.

Of course this invention is not limited to the particular embodiment which has just been described but extends to all variants in accordance with the spirit of the invention.

We claim:

1. Method for connecting optical fibres characterised in that it comprises stages consisting of:
   (i) effecting a controlled rough polishing of the interface (5) of the fibres (1) to be connected,
   (ii) steeping the ends of the fibres (1) in a concentrated solution of hydrofluoric acid, and
   (iii) aligning then connecting the fibres (1) using an index matching material.

2. Method according to claim 1 characterised in that the polishing operation (i) is effected with a polishing element with a grain size greater than $3\mu$.

3. Method according to claim 1, characterised in that the polishing operation (i) is effected with a polishing element with a grain size between 3 and $12\mu$.

4. Method according to claim 1, characterised in that the operation (ii) consists in steeping the ends of the fibres in a solution of hydrofluoric acid for a period more than 20 seconds.

5. Method according to claim 1, characterised in that operation (ii) consists in steeping the ends of the fibres in a solution of hydrofluoric acid for a period between 20 and 30 seconds.

6. Method according to claim 1, characterised in that the hydrofluoric acid used in stage (ii) has a concentration of around 40%.

7. Method according to claim 1, characterised in that the index matching material (6) is an oil.

8. Method according to claim 1, characterised in that the index matching material (6) is a UV polymerisable resin.

9. Method for connecting optical fibers comprising the steps of
  (i) effecting a controlled rough polishing of end faces of the fibers to be connected with a polishing element having a grain size between 3 μm and 12 μm,
  (ii) steeping the polished ends of the fibers in a solution of hydrofluoric acid having a concentration about 40% for a period between 20 and 30 seconds to generate cracks of an average width of 1 to 2 μm on the end faces of the optical fibers, and
  (iii) aligning and connecting the fibers using an index matching material.

10. Optical system comprising two optical fibres which have been rough polished, steeped in a concentrated solution of hydrofluoric acid and then aligned and connected with the use of an index matching material, characterised in that the interface 5 of the optical fibres has cracks of an average width of 1 to 2μ generated while said fibers were being steeped in said concentrated solution in the hydrofluoric acid solution.

11. Variable optical attenuator, characterised in that it comprises two optical fibres (40, 50) one end of each of which is previously treated by controlled rough polishing then steeped in a concentrated solution of hydrofluoric acid to prevent any Fresnel reflection, two supporting elements (20, 30) capable of controlled relative movement and adapted to receive and support respectively said fibres (40, 50) in such a way that the treated ends (42, 52) of said fibres are positioned facing each other, with their axes (23, 33) parallel, but with an overlap area which varies as a function of the relative position of said supporting elements (20, 30).

12. Variable optical attenuator according to claim 11, characterised in that one of the supporting elements (30) consists of a ferrule with an outer cylindrical casing bored with an eccentric hole (32) capable of receiving one of the fibres (50).

13. Variable optical attenuator according to claim 12, characterised in that the ferrule (30) is associated with a rotating drive element (60, 62).

14. Variable optical attenuator according to claim 13, characterised in that the rotating drive element comprises a journal (60) which carries a toric rubber belt (62) which lies on the external periphery of the ferrule (30).

15. Variable optical attenuator according to claim 11, characterised in that the two supporting elements (20, 30) are formed from identical ferrules with a cylindrical outer casing bored with an eccentric hole (22, 32) capable of receiving one of the fibres (40, 50), one of the ferrules (20) being fixed while the other (30) is guided in rotation about its axis.

16. Variable optical attenuator according to claim 15, characterised in that each of said ferules (20, 30) is made of a ceramic material.

17. Variable optical attenuator according to claim 11, characterised in that it comprises a base (10) including a V-shaped groove (12) which receives two ferrules (20, 30) bored with eccentric holes (22, 32), each of which receives one of the fibres (40, 50).

18. Variable optical attenuator according to claim 17 characterised in that the base (10) is made of a ceramic material.

19. System for measuring the effect of the reflection coefficient on an optical line, characterised in that it comprises a coupler (110) with two branches (111, 114) of known transfer ratio, having one end (112) of the first branch (111) coupled to an emitting means (110) while the second branch (114) of the coupler has one end (116) coupled through the intermediary of an optical attenuator in accordance with claim 11 to a reflecting means (130) and its second end (115) coupled to an optical detecting means (140).

20. System according to claim 19, characterised in that the coupler (110) is a coupler with a transfer ratio of 50/50.

21. System according to claim 19, characterised in that the second end (113) of the first branch (111) is linked to a transmission line (150).

22. System according to claim 19, characterised in that it comprises at least one connector (102, 151, 160) formed from anti-reflection treated half-connectors.

23. System according to claim 22, characterised in that the half-connectors (103, 104, 152, 153, 161, 162) are treated by controlled rough polishing then steeped in a concentrated solution of hydrofluoric acid to avoid any Fresnel reflection.

* * * * *

UNITED STATES PATENT AND TRADEMARK OFFICE
CERTIFICATE OF CORRECTION

PATENT NO. : 4,986,627
DATED : 1/22/91
INVENTOR(S) : Boscher et al.

It is certified that error in the above-identified patent and that said Letters Patent is hereby corrected as shown below:

ON THE TITLE PAGE:

[73]Assignee    after "Etat Francais"    insert --représenté par le Ministre des Postes, Télécommunications, l'Espace-- col. 05, line 63    delete "intermeidary"    insert --intermediary--

Signed and Sealed this

Twelfth Day of January, 1993

*Attest:*

DOUGLAS B. COMER

*Attesting Officer*    *Acting Commissioner of Patents and Trademarks*